(12) United States Patent
Shimada (10) Patent No.: US 9,423,596 B2
(45) Date of Patent: Aug. 23, 2016

(54) RETROFOCUS-TYPE WIDE ANGLE LENS AND IMAGING APPARATUS

(71) Applicant: FUJIFILM Corporation, Tokyo (JP)

(72) Inventor: Yasutaka Shimada, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/735,376

(22) Filed: Jun. 10, 2015

(65) Prior Publication Data
US 2015/0277089 A1    Oct. 1, 2015

Related U.S. Application Data

(63) Continuation of application No. PCT/JP2013/006937, filed on Nov. 26, 2013.

(30) Foreign Application Priority Data

Dec. 17, 2012 (JP) ................................ 2012-274475

(51) Int. Cl.
*G02B 13/04* (2006.01)
*G02B 9/12* (2006.01)

(52) U.S. Cl.
CPC ................ *G02B 13/04* (2013.01); *G02B 9/12* (2013.01)

(58) Field of Classification Search
CPC ..................................................... G02B 13/04
USPC ........................................................ 359/753
See application file for complete search history.

(56) References Cited

U.S. PATENT DOCUMENTS

| 4,348,085 A | 9/1982 | Mogami |
| 5,742,439 A | 4/1998 | Schuster |
| 6,894,847 B2 * | 5/2005 | Suzuki .................. G02B 13/04 359/680 |
| 2004/0136095 A1 | 7/2004 | Suzuki |

FOREIGN PATENT DOCUMENTS

| JP | 56-019021 | 2/1981 |
| JP | 08-094926 | 4/1996 |
| JP | 2004-117519 | 4/2004 |
| JP | 2004-219610 | 8/2004 |
| JP | 2006-003655 | 1/2006 |
| JP | 2011-186269 | 9/2011 |

OTHER PUBLICATIONS

International Search Report, PCT/JP2013/006937, Mar. 25, 2014.

* cited by examiner

*Primary Examiner* — James Jones
(74) *Attorney, Agent, or Firm* — Young & Thompson

(57) ABSTRACT

A retrofocus-type wide-angle lens consists of a negative first lens-group, a positive second lens-group, and a positive third lens-group in this order from an object-side. The first lens-group consists of a positive meniscus-lens with its convex surface facing the object-side and three negative meniscus-lenses with their convex surfaces facing the object-side in this order from the object-side. The second lens-group includes two cemented lenses, and a lens closest to an image-side in the second lens-group is one of the at least two cemented lenses. The third lens-group consists of a 3a-th lens-group, which consists of a positive meniscus-lens with its convex surface facing the object-side and a negative meniscus-lens with its convex surface facing the object-side, and a 3b-th lens-group, which includes at least two cemented lenses and has positive refractive power as a whole, in this order from the object-side.

15 Claims, 8 Drawing Sheets

FIG.1 EXAMPLE 1

FIG.2

FIG.3 EXAMPLE 2

FIG.4 EXAMPLE 3

FIG.5 EXAMPLE 4

FIG.10

RETROFOCUS-TYPE WIDE ANGLE LENS AND IMAGING APPARATUS

CROSS-REFERENCE TO RELATED APPLICATIONS

This application is a Continuation of PCT International Application No. PCT/JP2013/006937 filed on Nov. 26, 2013, which claims priority under 35 U.S.C §119(a) to Japanese Patent Application No. 2012-274475 filed on Dec. 17, 2012. Each of the above applications is hereby expressly incorporated by reference, in its entirety, into the present application.

BACKGROUND OF THE INVENTION

1. Field of the Invention

The present invention relates to a retrofocus-type wide angle lens and an imaging apparatus on which this lens has been mounted. In particular, the present invention relates to a retrofocus-type wide angle lens appropriate for use in a middle-size single-lens reflex camera and an imaging apparatus on which this retrofocus-type wide angle lens has been mounted.

2. Description of the Related Art

Generally, a sufficient length of backfocus needs to be secured in a wide angle lens for a single-lens reflex camera. Therefore, many wide angle lenses for single-lens reflex cameras adopt retrofocus-type lens configuration in which a front part and a rear part are asymmetrical with respect to a stop by arranging a lens group or groups having negative power and a lens group or groups having positive refractive power in this order from the object side. As such a retrofocus-type wide angle lens in which various aberrations are excellently corrected, lenses disclosed for example in Japanese Unexamined Patent Publication No. 8(1996)-094926 (Patent Document 1) and Japanese Patent No. 2004-219610 (Patent Document 2) have been proposed.

SUMMARY OF THE INVENTION

Those disclosed in Patent Documents 1 and 2 are appropriate to widen the angle of view, because a lens group having negative refractive power and a lens group having positive refractive power are arranged in this order from the object side. Although the lenses are appropriate to widen the angle of view, there is a problem that it is difficult to meet a request for a small F-number because the positive refractive power of the rear group is strong. For example, F-numbers are about 3.6 in the retrofocus-type wide angle lenses disclosed in Patent Documents 1 and 2.

In view of the foregoing circumstances, it is an object of the present invention to provide a retrofocus-type wide angle lens with a small F-number while various aberrations are excellently corrected, and an imaging apparatus on which this wide angle lens has been mounted.

A retrofocus-type wide angle lens of the present invention consists of a first lens group having negative refractive power as a whole, a second lens group having positive refractive power as a whole, and a third lens group having positive refractive power as a whole in this order from an object side. The first lens group consists of a positive meniscus lens with its convex surface facing the object side and three negative meniscus lenses with their convex surfaces facing the object side in this order from the object side. The second lens group includes at least two cemented lenses, and a lens closest to an image side in the second lens group is one of the at least two cemented lenses. The third lens group consists of a 3a-th lens group, which consists of a positive meniscus lens with its convex surface facing the object side and a negative meniscus lens with its convex surface facing the object side, and a 3b-th lens group, which includes at least two cemented lenses and has positive refractive power as a whole, in this order from the object side.

The retrofocus-type wide angle lens of the present invention consists of the first lens group, the second lens group and the third lens group. The retrofocus-type wide angle lens may include lenses substantially without any refractive power, optical elements, such as a stop and a cover glass, other than lenses, mechanism parts, such as a lens flange, a lens barrel, an imaging device and a hand shake blur correction mechanism, and the like in addition to the three lens groups.

In the present invention, the surface shape of a lens, such as a convex surface, a concave surface, a flat surface, biconcave, meniscus, biconvex, plano-convex and plano-concave, and the sign of the refractive power of a lens, such as positive and negative, are considered in a paraxial region unless otherwise mentioned when the lens includes an aspheric surface. In the present invention, the sign of a curvature radius is positive when a surface shape is convex toward the object side, and negative when a surface shape is convex toward the image side.

In the retrofocus-type wide angle lens of the present invention, it is desirable that a lens having positive refractive power is arranged closest to the image side in the 3b-th lens group.

Further, in the retrofocus-type wide angle lens of the present invention, it is desirable that the 3b-th lens group includes a third-group first cemented lens having a cemented surface that is convex toward the object side and a third-group second cemented lens having a cemented surface that is convex toward the image side in this order from the object side.

In the retrofocus-type wide angle lens of the present invention, it is desirable that the second lens group includes a second-group first cemented lens having a cemented surface that is convex toward the image side and a second-group second cemented lens having a cemented surface that is convex toward the object side in this order from the object side.

In the retrofocus-type wide angle lens of the present invention, it is desirable that a stop is arranged closer to the object side than a surface closest to the image side in the 3a-th lens group.

In the retrofocus-type wide angle lens of the present invention, it is desirable that focusing is performed by moving the 3b-th lens group in the direction of an optical axis.

In the retrofocus-type wide angle lens of the present invention, it is desirable that the following conditional expression (1) is satisfied:

$$-1.4 < f/f1 < -0.6 \qquad (1),\text{ where}$$

f: a focal length of an entire system, and
f1: a focal length of the first lens group.

In the retrofocus-type wide angle lens of the present invention, it is desirable that the following conditional expression (2) is satisfied:

$$0.3 < f/f3b < 0.6 \qquad (2),\text{ where}$$

f: a focal length of an entire system, and
f3b: a focal length of the 3b-th lens group.

In the retrofocus-type wide angle lens of the present invention, it is desirable that the following conditional expression (3) is satisfied:

$$0.3 < f/f2 < 0.7 \quad (3),$$ where f: a focal length of an entire system, and
f2: a focal length of the second lens group.

Further, in the retrofocus-type wide angle lens of the present invention, it is desirable that one of the at least two cemented lenses closest to the object side in the second lens group includes a lens having positive refractive power, and that refractive index nd2p for d-line of the lens having positive refractive power satisfies the following conditional expression (4):

$$1.80 < nd2p \quad (4).$$

Further, it is more desirable that the retrofocus-type wide angle lens of the present invention satisfies at least one of the following conditional expressions (1-1), (2-1), (3-1) and (4-1):

$$-1.2 < f/f1 < -0.8 \quad (1\text{-}1);$$

$$0.4 < f/f3b < 0.5 \quad (2\text{-}1);$$

$$0.4 < f/f2 < 0.6 \quad (3\text{-}1); \text{ and}$$

$$1.84 < nd2p \quad (4\text{-}1).$$

An imaging apparatus of the present invention includes the retrofocus-type wide angle lens of the present invention mounted thereon.

As described already, a conventional retrofocus-type wide angle lens consists of a front group having negative refractive power and a rear group having positive refractive power in this order from the object side. Therefore, the retrofocus-type wide angle lens is appropriate to widen the angle of view. However, there was a problem that it is difficult to meet a request for a small F-number, because the positive refractive power of the rear group is strong. According to the present invention, a lens group corresponding to the rear group of the conventional retrofocus-type wide angle lens is divided into two lens groups of the second lens group having positive refractive power and the third lens group having positive refractive power. Therefore, it is possible to reduce the value of F-number by distributing the refractive power to the lens groups.

Further, a positive meniscus lens with its convex surface facing the object side is arranged closest to the object side in the first lens group. Therefore, it is possible to reduce the total length of the optical system, and to reduce the effective aperture of the optical system. Further, it is possible to excellently correct distortion and a lateral chromatic aberration. Further, negative refractive power following the positive meniscus lens with its convex surface facing the object side is distributed to three negative meniscus lenses with their convex surface facing the object side. Therefore, it is possible to excellently correct distortion and a spherical aberration.

Since the second lens group includes at least two cemented lenses, it is possible to excellently correct a longitudinal chromatic aberration and a lateral chromatic aberration.

Since the 3a-th lens group consists of a positive meniscus lens with its convex surface facing the object side and a negative meniscus lens with its convex surface facing the object side, it is possible to excellently maintain the balance between a spherical aberration and astigmatism. Further, since the 3b-th lens group includes at least two cemented lenses, it is possible to correct a longitudinal chromatic aberration without generating high-order chromatic aberrations.

When the 3b-th lens group includes a lens having positive refractive power closest to the image side, it is possible to reduce a spherical aberration. Consequently, it is possible to easily meet a request for a small F-number.

When the 3b-th lens group includes a third-group first cemented lens having a cemented surface that is convex toward the object side and a third-group second cemented lens having a cemented surface that is convex toward the image side in this order from the object side, it is possible to reduce a high-order spherical aberration and a difference in spherical aberrations depending on wavelengths. Further, the height of an axial marginal ray at the third-group second cemented lens is lower than the height of the axial marginal ray at the third-group first cemented lens, and the height of an off-axial ray at the third-group second cemented lens is higher than the height of the off-axial ray at the third-group first cemented lens. Therefore, the effect of the third-group second cemented lens given to off-axial aberrations is greater than the effect of the third-group second cemented lens given to a spherical aberration. Hence, when the cemented surface of the third-group first cemented lens is convex toward the object side and the cemented surface of the third-group second cemented lens is convex toward the image side, it is possible to excellently correct astigmatism.

When the cemented surface of the second-group first cemented lens is convex toward the image side, a difference in spherical aberrations depending on wavelengths is less likely to be generated. When the cemented surface of the second-group second cemented lens is convex toward the object side, it is possible to excellently correct a lateral chromatic aberration.

When a stop is arranged closer to the object side than a surface closest to the image side in the 3a-th lens group, it is possible to balance the effective aperture of the lens closest to the object side, and to reduce the size of the optical system.

When focusing is performed by moving the 3b-th lens group in the direction of the optical axis, it is possible to reduce the weight of the group that moves during focusing while the optical system has a small F-number, and to suppress fluctuations of a spherical aberration and curvature of field caused by focusing.

The imaging apparatus of the present invention includes the retrofocus-type wide angle lens of the present invention. Therefore, the imaging apparatus having high performance is configurable, and excellent images are obtainable by using an imaging device.

DESCRIPTION OF THE PREFERRED EMBODIMENTS

Figure 1:
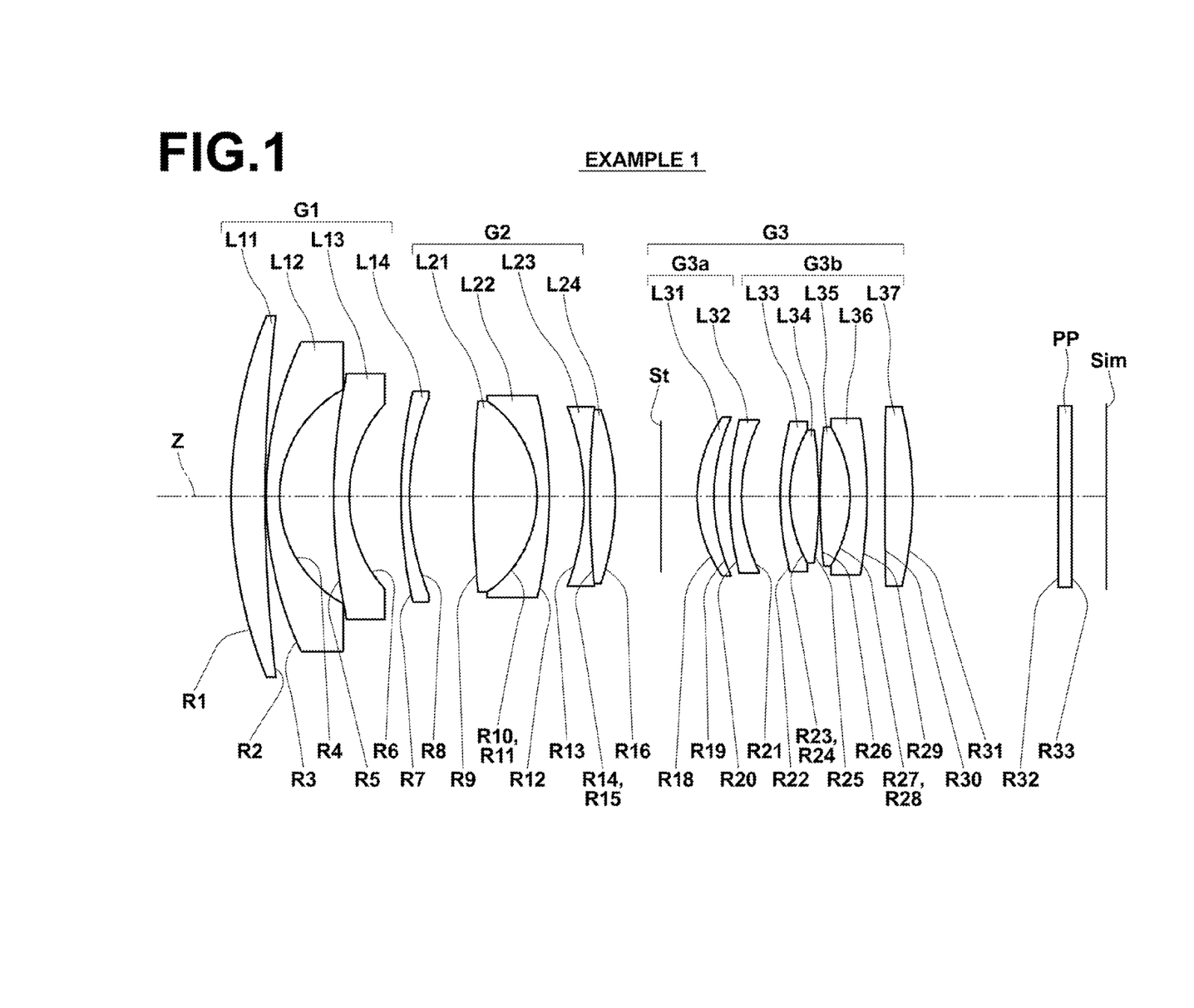
FIG. 1 is a cross section illustrating the lens configuration of a retrofocus-type wide angle lens according to Example 1 of the present invention.
Figure 2:
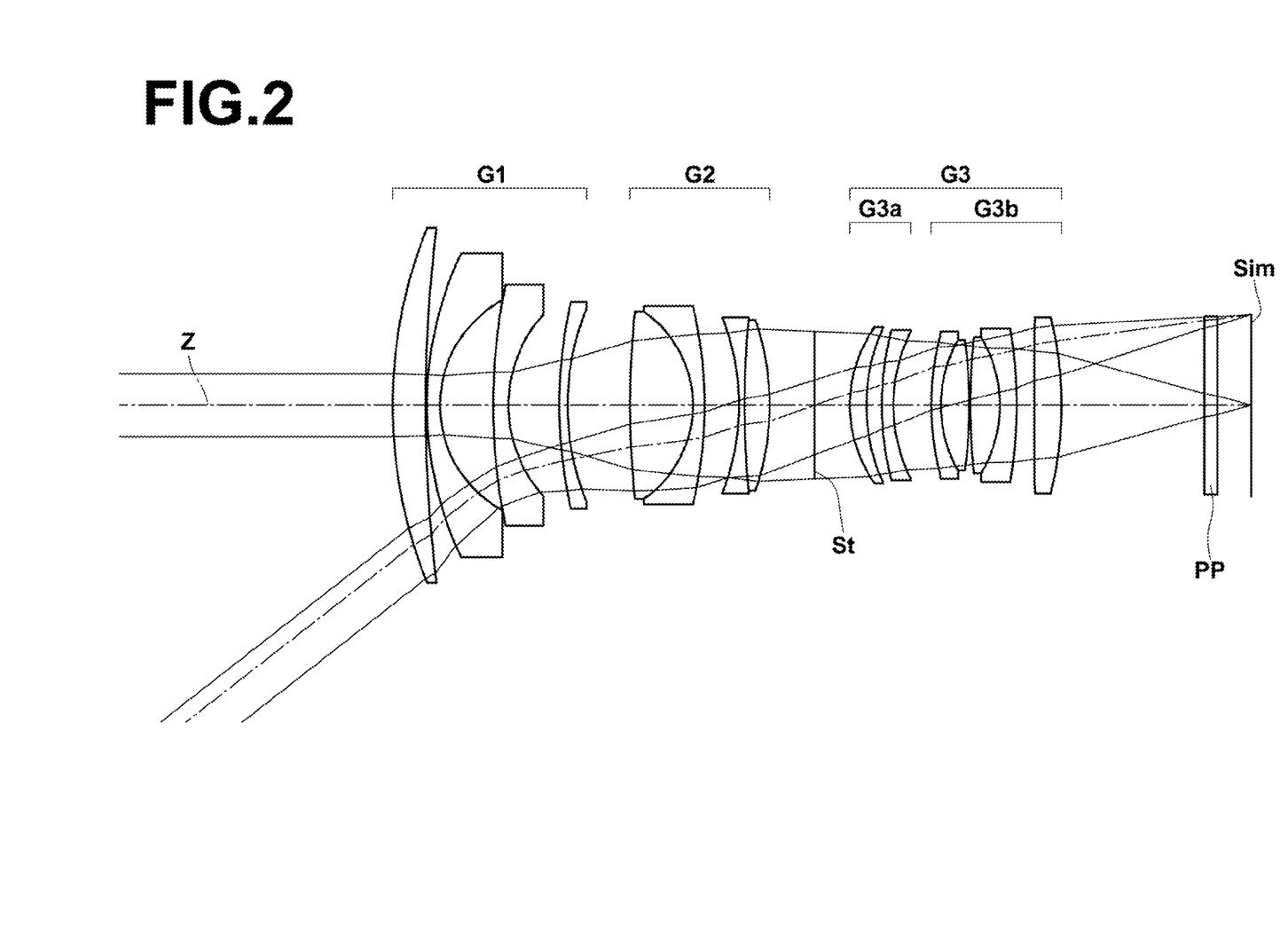
FIG. 2 is a cross section illustrating the lens configuration of the retrofocus-type wide angle lens in Example 1 of the present invention including optical paths.
Figure 3:
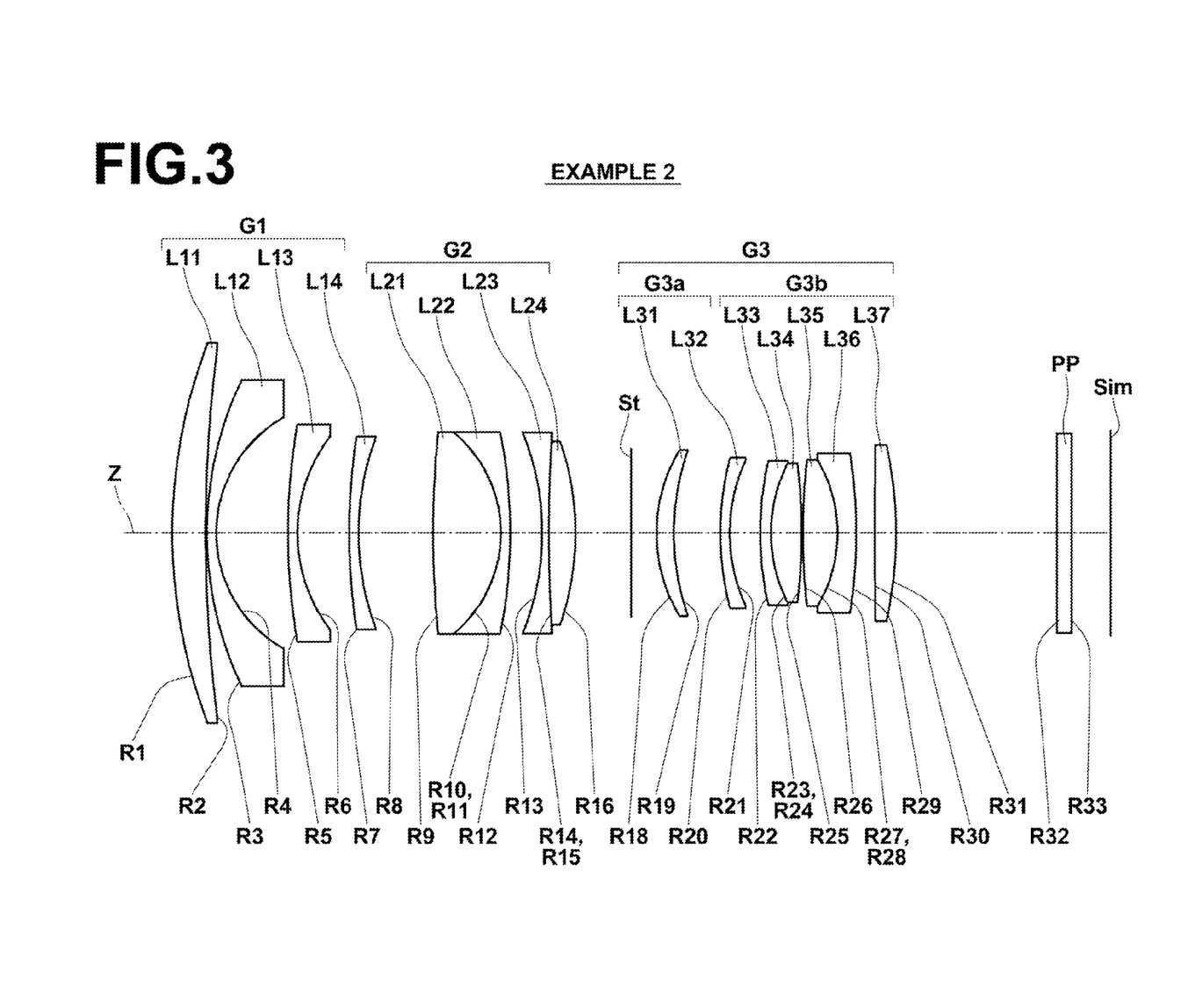
FIG. 3 is a cross section illustrating the lens configuration of a retrofocus-type wide angle lens according to Example 2 of the present invention.
Figure 4:
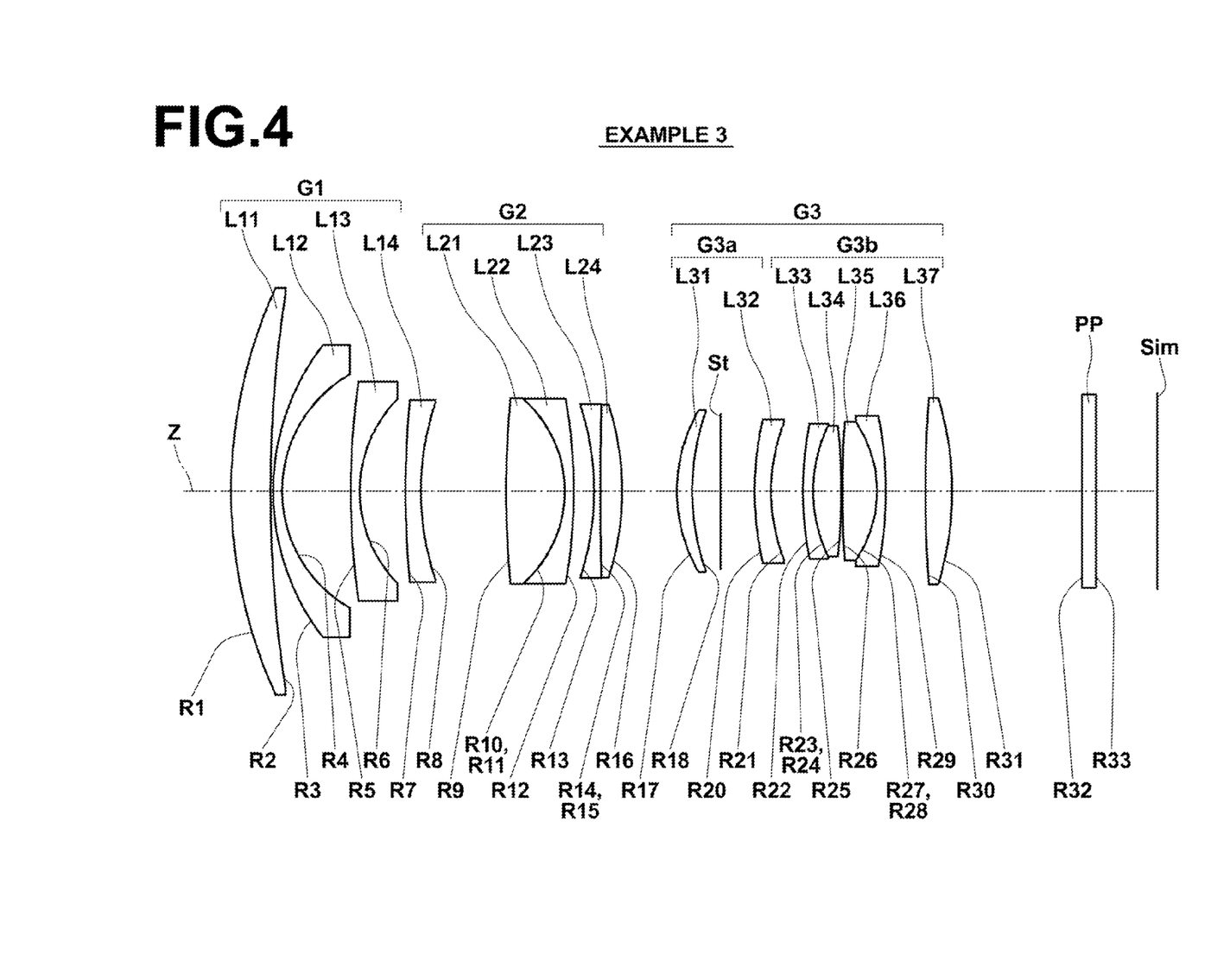
FIG. 4 is a cross section illustrating the lens configuration of a retrofocus-type wide angle lens according to Example 3 of the present invention.
Figure 5:
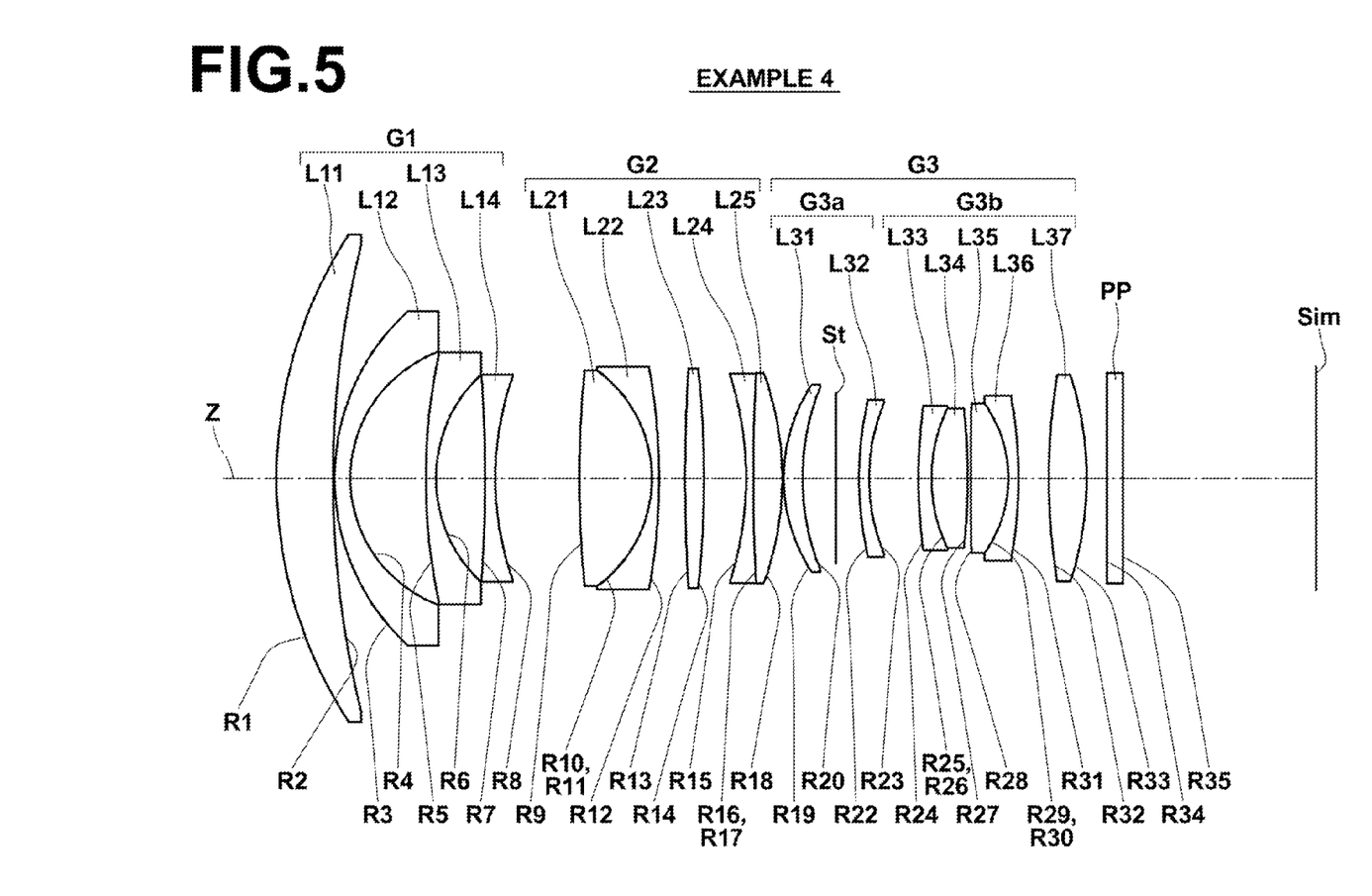
FIG. 5 is a cross section illustrating the lens configuration of a retrofocus-type wide angle lens according to Example 4 of the present invention.

Next, embodiments of the present invention will be described in detail with reference to drawings. FIG. 1 is a cross section illustrating an example of the configuration of a retrofocus-type wide angle lens according to an embodiment of the present invention. FIG. 1 corresponds to a retrofocus-type wide angle lens in Example 1, which will be described later. FIG. 2 illustrates a diagram of optical paths of the retrofocus-type wide angle lens in Example 1. FIG. 2 illustrates axial rays from an object point at a distance of infinity and off-axial rays at a maximum angle of view. Further, FIG. 3 through FIG. 5 illustrate cross sections illustrating other examples of configuration according to embodiments of the present invention. FIG. 3 through FIG. 5 correspond to retrofocus-type wide angle lenses in Examples 2 through 4, which will be described later, respectively. The basic configuration of the examples illustrated in FIG. 1 through FIG. 5 is almost similar to each other. Further, the illustration method is also similar. Therefore, the retrofocus-type wide angle lens according to the embodiments of the present invention will be described mainly with reference to FIG. 1.

In FIG. 1, the left side is the object side, and the right side is the image side. FIG. 1 illustrates the arrangement of the optical system in the state of being focused at infinity. FIG. 2 through FIG. 5, which will be described later, are illustrated in a similar manner to FIG. 1.

The retrofocus-type wide angle lens according to an embodiment of the present invention consists of first lens group G1 having negative refractive power as a whole, second lens group G2 having positive refractive power as a whole, and third lens G3 group having positive refractive power as a whole in this order from an object side.

First lens group G1 consists of positive meniscus lens L11 with its convex surface facing the object side and three negative meniscus lenses L12, L13 and L14 with their convex surfaces facing the object side in this order from the object side. First lens group G1 in Examples 2 through 4, which will be described later, is configured in a similar manner to Example 1.

Second lens group G2 includes at least two cemented lenses, and a lens closest to an image side in second lens group G2 is one of the at least two cemented lenses. In the present embodiment, second lens group G2 consists of a second-group first cemented lens of biconvex lens L21 and negative meniscus lens L22 with its convex surface facing the image side and a second-group second cemented lens of biconcave lens L23 and biconvex lens L24 in this order from the object side. In the present embodiment, it is desirable that the second-group first cemented lens has a cemented surface that is convex toward the image side and that the second-group second cemented lens has a cemented surface that is convex toward the object side. When the cemented surface of the second-group first cemented lens is convex toward the image side in this manner, a difference in spherical aberrations depending on wavelengths tends not to be generated. When the cemented surface of the second-group second cemented lens is convex toward the object side, it is possible to excellently correct a lateral chromatic aberration.

In Examples 2 and 3, which will be described later, second lens group G2 is configured in a similar manner to Example 1. In Example 4, second lens group G2 consists of a second-group first cemented lens of biconvex lens L21 and negative meniscus lens L22 with its convex surface facing the image side, biconvex lens L23, and a second-group second cemented lens of biconcave lens L24 and biconvex lens L25 in this order from the object side.

Third lens group G3 consists of 3a-th lens group G3a, which consists of a positive meniscus lens with its convex surface facing the object side and a negative meniscus lens with its convex surface facing the object side, and 3b-th lens group G3b, which includes at least two cemented lenses and has positive refractive power as a whole, in this order from the object side. In the present embodiment, 3a-th lens group G3a consists of positive meniscus lens L31 with its convex surface facing the object side and negative meniscus lens L32 with its convex surface facing the object side in this order from the object side. Further, 3b-th lens group G3b includes a third-group first cemented lens of negative meniscus lens L33 with its convex surface facing the object side and biconvex lens L34 and third-group second cemented lens of biconvex lens L35 and negative meniscus lens L36 with is convex surface facing the image side in this order from the object side.

In the present embodiment, it is desirable that the cemented surface of the third-group first cemented lens is convex toward the object side and that the cemented surface of the third-group second cemented lens is convex toward the image side. Accordingly, it is possible to reduce a high-order spherical aberration and a difference in spherical aberrations depending on wavelengths. As illustrated in FIG. 2, the height of an axial marginal ray at the third-group second cemented lens is lower than the height of the axial marginal ray at the third-group first cemented lens, and the height of an off-axial ray at the third-group second cemented lens is higher than the height of the off-axial ray at the third-group first cemented lens. Therefore, the effect of the third-group second cemented lens given to off-axial aberrations is greater than the effect of the third-group second cemented lens given to a spherical aberration. Hence, when the cemented surface of the third-group first cemented lens is convex toward the object side and the cemented surface of the third-group second cemented lens is convex toward the image side, it is possible to excellently correct astigmatism.

In the present embodiment, it is desirable that 3b-th lens group G3b includes lens L37 having positive refractive power closest to the image side. Accordingly, it is possible to reduce a spherical aberration. Therefore, it is possible to make the retrofocus-type wide angle lens according to the present embodiment easily meet a request for a small F-number.

In Examples 2 through 4, which will be described later, 3a-th lens group G3a is configured in a similar manner to Example 1. In Examples 2 through 4, which will be described later, 3b-th lens group G3b is configured also in a similar manner to Example 1.

Aperture stop St is arranged closer to the object side than a surface closest to the image side in 3a-th lens group G3a. In the present embodiment, aperture stop St is arranged between second lens group G2 and third lens group G3. When aperture stop St is arranged in this manner, it is possible to balance the effective aperture of the lens closest to the object side, and to reduce the size of the optical system. In Examples 3 and 4, which will be described later, aperture stop St is arranged between positive meniscus lens L31 with its convex surface facing the object side and negative meniscus lens L32 with its convex surface facing the object side in 3a-th lens group G3a.

Aperture stop St, illustrated in FIG. 1, does not necessarily represent the size nor the shape of the aperture stop, but the position of the aperture stop on optical axis Z. Further, imaging surface Sim is illustrated in FIG. 1. An imaging device, for example, such as a CCD (Charge Coupled Device) and a CMOS (Complementary Metal Oxide Semiconductor), is arranged at this position, as will be described later.

FIG. 1 illustrates an example in which parallel-flat-plate-shaped optical member PP is arranged between third lens group G3 and imaging surface Sim. When a retrofocus-type wide angle lens is applied to an imaging apparatus, a cover glass and various filters, such as an infrared-ray-cut filter and a low-pass filter, are arranged between an optical system and imaging surface Sim based on the configuration of the imaging apparatus on which the lens is often mounted. Optical member PP is assumed to be such members.

In the retrofocus-type wide angle lens of the present embodiment, it is desirable that focusing is performed by moving, along optical axis Z, first lens group Gl1, aperture stop St and second lens group G2 in an integrated manner while keeping third lens group G3 fixed. Accordingly, it is possible to reduce the weight of the lens groups that move during focusing while the optical system has a small F-number, and to suppress fluctuations of a spherical aberration and curvature of field caused by focusing.

Meanwhile, a conventional retrofocus-type wide angle lens consists of a front group having negative refractive power and a rear group having positive refractive power in this order from the object side. Therefore, the conventional retrofocus-type wide angle lens is appropriate to widen the angle of view. However, there was a problem that it is difficult to meet a request for a small F-number because the positive refractive power of the rear group becomes strong. According to the retrofocus-type wide angle lens of the present embodiment, a lens group corresponding to the rear group in the conventional retrofocus-type wide angle lens is divided into two lens groups of second lens group G2 having positive refractive power and third lens group G3 having positive refractive power. Therefore, it is possible to reduce the value of F-number by distributing the refractive power to the lens groups.

Further, positive meniscus lens L11 with its convex surface facing the object side is arranged closest to the object side in first lens group G1. Therefore, it is possible to reduce the total length of the optical system, and to reduce the effective aperture of the optical system. Further, it is possible to excellently correct distortion and a lateral chromatic aberration. Further, negative refractive power following positive meniscus lens L11 with its convex surface facing the object side is distributed to three negative meniscus lenses L12 through L14 with their convex surface facing the object side. Therefore, it is possible to excellently correct distortion and a spherical aberration.

Since second lens group G2 includes at least two cemented lenses, it is possible to excellently correct a longitudinal chromatic aberration and a lateral chromatic aberration.

Since 3a-th lens group G3a consists of positive meniscus lens L31 with its convex surface facing the object side and negative meniscus lens L32 with its convex surface facing the object side, it is possible to excellently maintain the balance between a spherical aberration and astigmatism. Further, since 3b-th lens group G3b includes at least two cemented lenses, it is possible to correct a longitudinal chromatic aberration without generating high-order chromatic aberrations.

Next, the desirable configuration of the retrofocus-type wide angle lens according to the aforementioned embodiment of the present invention will be described. Here, a desirable mode may include any one of the following aspects of configuration, or a combination of arbitrary two or more aspects of configuration.

Regarding the focal length of first lens group G1, it is desirable that the following conditional expression (1) is satisfied:

$$-1.4 < f/f1 < -0.6 \quad (1),\text{ where}$$

f: a focal length of an entire system, and
f1: a focal length of first lens group G1.

If the value is lower than the lower limit of conditional expression (1), the negative refractive power of first lens group G1 becomes too strong, and correction of distortion and a lateral chromatic aberration becomes difficult. If the value is higher than the higher limit of conditional expression (1), the negative refractive power of first lens group G1 becomes too weak, and it becomes difficult to widen the angle of view. Further, it becomes difficult to secure a backfocus.

In the retrofocus-type wide angle lens of the present embodiment, when especially conditional expression (1-1) is satisfied in the range defined by conditional expression (1), the aforementioned effect is more remarkable:

$$-1.2 < f/f1 < -0.8 \quad (1\text{-}1).$$

Regarding the focal length of 3b-th lens group G3b, it is desirable that the following conditional expression (2) is satisfied:

$$0.3 < f/f3b < 0.6 \quad (2),\text{ where}$$

f: a focal length of an entire system, and
f3b: a focal length of the 3b-th lens group G3b.

If the value is lower than the lower limit of conditional expression (2), the positive refractive power of 3b-th lens group G3b becomes too weak, and the amount of movement during focusing becomes large. Therefore, focusing at a high speed becomes difficult. If the value is higher than the higher limit of conditional expression (2), the positive refractive power of 3b-th lens group G3b becomes too strong, and fluctuations of a spherical aberration and curvature of field caused by focusing become large.

In the retrofocus-type wide angle lens of the present embodiment, when especially conditional expression (2-1) is satisfied in the range defined by conditional expression (2), the aforementioned effect is more remarkable:

$$0.4 < f/f3b < 0.5 \quad (2\text{-}1).$$

Regarding the focal length of second lens group G2, it is desirable that the following conditional expression (3) is satisfied:

$$0.3<f/f2<0.7 \quad (3),$$ where f: a focal length of an entire system, and
f2: a focal length of second lens group G2.

If the value is lower than the lower limit of conditional expression (3), the positive refractive power of second lens group G2 becomes too weak, and correction of a spherical aberration and a lateral chromatic aberration becomes difficult. If the value is higher than the higher limit of conditional expression (3), the positive refractive power of 3b-th lens group G3b becomes too strong, and it becomes difficult to secure a backfocus.

In the retrofocus-type wide angle lens of the present embodiment, when especially conditional expression (3-1) is satisfied in the range defined by conditional expression (3), the aforementioned effect is more remarkable:

$$0.4<f/f2<0.6 \quad (3-1).$$

Regarding refractive index nd2p for d-line of lens L21 having positive refractive power constituting the second-group first cemented lens in second lens group G2, it is desirable that the following conditional expression (4) is satisfied:

$$1.80<nd2p \quad (4).$$

If the value is lower than the lower limit of conditional expression (4), that is disadvantageous to correction of curvature of field.

In the retrofocus-type wide angle lens of the present embodiment, when especially conditional expression (4-1) is satisfied in the range defined by conditional expression (4), the aforementioned effect is more remarkable:

$$1.84<nd2p \quad (4-1).$$

EXAMPLES

Next, regarding examples of the retrofocus-type wide angle lens of the present invention, especially numerical values examples will be mainly described in detail.

Example 1

FIG. 1 illustrates the arrangement of lens groups in a retrofocus-type wide angle lens in Example 1. Since lens groups and each lens in the configuration illustrated in FIG. 1 have been described in detail already, repetition of the explanation will be omitted here unless necessary.

Table 1 shows basic lens data of the retrofocus-type wide angle lens in Example 1, and Table 2 shows other data of the retrofocus-type wide angle lens in Example 1. Similarly, Table 3 through Table 8 show basic lens data and other data of the retrofocus-type wide angle lenses in Examples 2 through 4. Next, the meanings of signs in the tables will be described by using the tables of Example 1, as an example. The meanings in Examples 2 through 4 are basically similar to Example 1. Here, Tables 1 through 8 show numerical value data normalized so that the focal length of the entire system is 1.

In the basic lens data of Table 1, a column of Si shows the surface number of an i-th (i=1, 2, 3, ...) surface when an object-side surface of a composition element closest to the object side is the first surface and the surface numbers sequentially increase toward the image side. A column of Ri shows the curvature radius of the i-th surface. A column of Di shows a surface distance, on optical axis Z, between the i-th surface and the (i+1)th surface. Here, the sign of a curvature radius is positive when a surface shape is convex toward the object side, and negative when a surface shape is convex toward the image side. In the column of surface distance Di, a surface distance between cemented surfaces in a cemented lens is represented as 0.

In the basic lens data, a column of ndj shows the refractive index for d-line (wavelength is 587.6 nm) of a j-th (j=1, 2, 3, ...) composition element when a lens closest to the object side is the first lens and the numbers sequentially increase toward the image side. A column of vdj shows the Abbe number for d-line of the j-th composition element. Here, the basic lens data also include aperture stop St, and the term "surface number (STOP)" is written in a row of the surface number of a surface corresponding to aperture stop St.

Other data in Table 2 show values of a focal length (f') of an entire system, backfocus (air equivalent length) Bf', an F-number (FNo.), and full angle of view (2ω) in the state of being focused at infinity.

The description method of Tables 3 through 8, which will be described later, is similar to the description method of Table 1 and Table 2, which have been described.

In all of the following tables, degrees(°) are used as the unit of angles. However, since an optical system is usable by being proportionally enlarged or proportionally reduced, other appropriate units may be used.

TABLE 1

EXAMPLE 1·BASIC LENS DATA

| Si | Ri | Di | ndj | vdj |
|---|---|---|---|---|
| 1 | 3.9363 | 0.28 | 1.77250 | 49.60 |
| 2 | 12.3190 | 0.01 | | |
| 3 | 2.9576 | 0.11 | 1.61800 | 63.33 |
| 4 | 0.9988 | 0.45 | | |
| 5 | 4.8007 | 0.13 | 1.80518 | 25.42 |
| 6 | 1.1389 | 0.43 | | |
| 7 | 3.9048 | 0.07 | 1.48749 | 70.23 |
| 8 | 2.1160 | 0.53 | | |
| 9 | 7.6245 | 0.53 | 1.90366 | 31.32 |
| 10 | −0.9548 | 0.00 | 1.56002 | 37.65 |
| 11 | −0.9548 | 0.10 | 1.84661 | 23.78 |
| 12 | −3.5546 | 0.29 | | |
| 13 | −2.0163 | 0.05 | 1.60562 | 43.70 |
| 14 | 7.6677 | 0.00 | 1.56002 | 37.65 |
| 15 | 7.6677 | 0.21 | 1.80518 | 25.42 |
| 16 | −2.1903 | 0.38 | | |
| 17(STOP) | ∞ | 0.30 | | |
| 18 | 1.1391 | 0.14 | 1.51633 | 64.14 |
| 19 | 1.5798 | 0.13 | | |
| 20 | 2.5125 | 0.10 | 1.51823 | 58.90 |
| 21 | 1.4009 | 0.32 | | |
| 22 | 2.3878 | 0.08 | 1.80518 | 25.42 |
| 23 | 1.1106 | 0.00 | 1.56002 | 37.65 |
| 24 | 1.1106 | 0.24 | 1.49700 | 81.54 |
| 25 | −3.9634 | 0.01 | | |
| 26 | 5.2415 | 0.25 | 1.49700 | 81.54 |
| 27 | −1.1023 | 0.00 | 1.56002 | 37.65 |
| 28 | −1.1023 | 0.14 | 1.80518 | 25.42 |
| 29 | −3.8992 | 0.15 | | |
| 30 | 47.7185 | 0.23 | 1.80000 | 29.84 |
| 31 | −3.0888 | 1.21 | | |
| 32 | ∞ | 0.11 | 1.51633 | 64.14 |
| 33 | ∞ | 0.29 | | |

TABLE 2

EXAMPLE 1·OTHER DATA

| | |
|---|---|
| f | 1.00 |
| Bf | 1.57 |
| FNo. | 1.90 |
| 2ω[°] | 75.4 |

Figure 6:
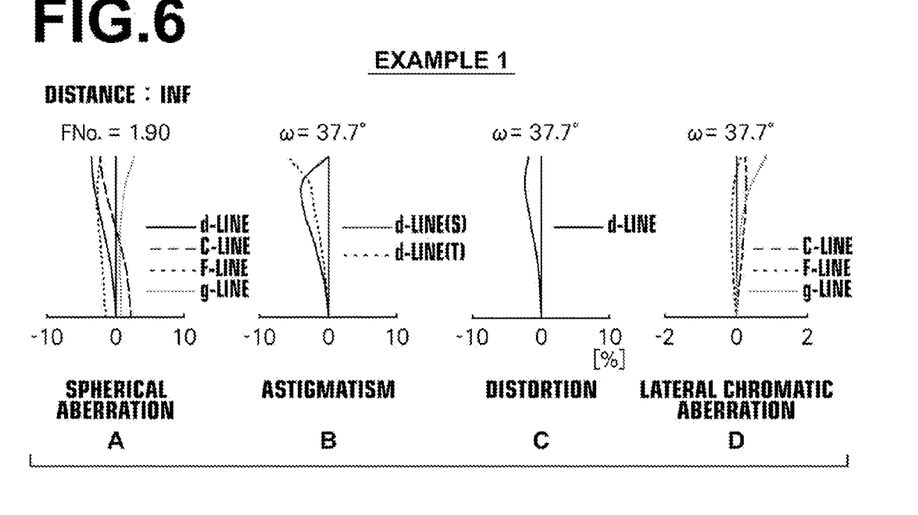
FIG. 6, Sections A through D are aberration diagrams of the retrofocus-type wide angle lens in Example 1 of the present invention.
Figure 7:
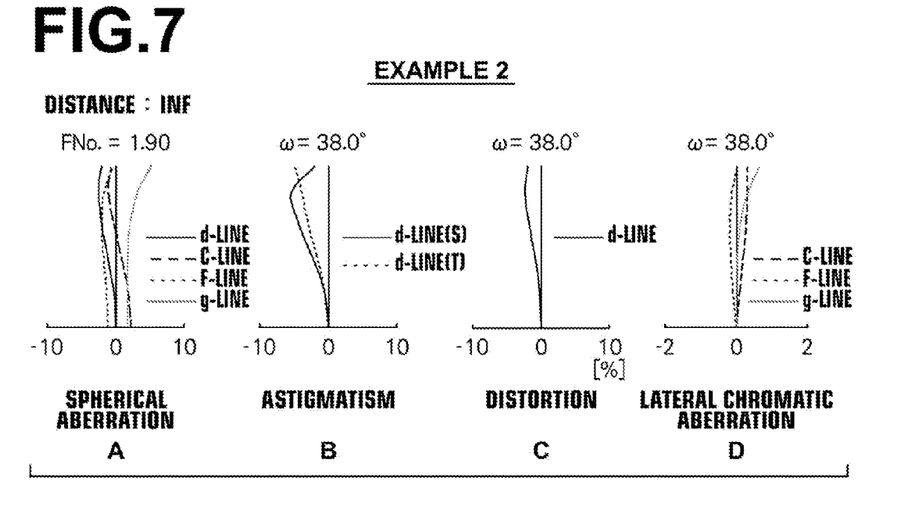
FIG. 7, Sections A through D are aberration diagrams of the retrofocus-type wide angle lens in Example 2 of the present invention.
Figure 8:
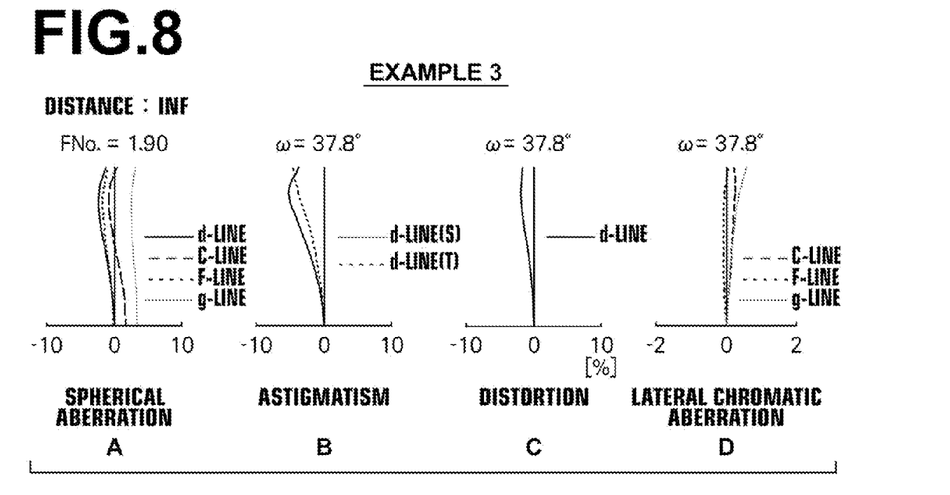
FIG. 8, Sections A through D are aberration diagrams of the retrofocus-type wide angle lens in Example 3 of the present invention.
Figure 9:
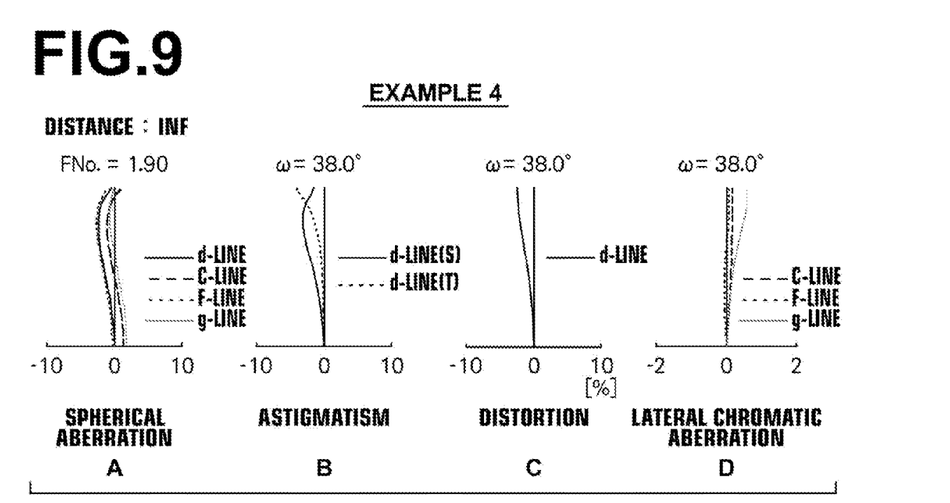
FIG. 9, Sections A through D are aberration diagrams of the retrofocus-type wide angle lens in Example 4 of the present invention.

Here, FIG. 6, Sections A through D illustrate a spherical aberration, astigmatism, distortion, and a lateral chromatic aberration of the retrofocus-type wide angle lens in Example 1, respectively, in the state of being focused at infinity. The aberrations for d-line (wavelength is 587.6 nm) are illustrated. In the diagram of a spherical aberration, aberrations for C-line (wavelength is 656.3 nm), F-line (wavelength is 486.1 nm), and g-line (wavelength is 436 nm) are also illustrated. Especially, in the diagram of a lateral chromatic aberration, aberrations for C-line (wavelength is 656.3 nm), F-line (wavelength is 486.1 nm), and g-line (wavelength is 436 nm) are illustrated. In the diagram of astigmatism, an aberration in a sagittal direction is indicated by a solid line, and an aberration in a tangential direction is indicated by a dotted line. In the diagram of a spherical aberration FNo. represents an F-number. In the other diagrams, ω represents a half angle of view. The illustration method of aberration in FIG. 7 through FIG. 9 is similar to the illustration method, as described above.

Example 2

FIG. 3 illustrates the arrangement of lens groups in a retrofocus-type wide angle lens in Example 2. The retrofocus-type wide angle lens in Example 2 is configured almost similar to the retrofocus-type wide angle lens in Example 1, which has been described already. Table 3 shows basic lens data of the retrofocus-type wide angle lens in Example 2, and Table 4 shows other data of the retrofocus-type wide angle lens in Example 2. FIG. 7, Sections A through D are diagrams illustrating various aberrations of the retrofocus-type wide angle lens in Example 2.

TABLE 3

EXAMPLE 2·BASIC LENS DATA

| Si | Ri | Di | ndj | vdj |
|---|---|---|---|---|
| 1 | 3.9025 | 0.25 | 1.77250 | 49.60 |
| 2 | 10.8485 | 0.01 | | |
| 3 | 2.6263 | 0.07 | 1.61800 | 63.33 |
| 4 | 0.9882 | 0.54 | | |
| 5 | 4.7821 | 0.07 | 1.80518 | 25.42 |
| 6 | 1.1788 | 0.39 | | |
| 7 | 4.7936 | 0.07 | 1.48749 | 70.23 |
| 8 | 2.0250 | 0.56 | | |
| 9 | 7.2681 | 0.51 | 1.90366 | 31.32 |
| 10 | −0.9675 | 0.00 | 1.56002 | 37.65 |
| 11 | −0.9675 | 0.07 | 1.84661 | 23.78 |
| 12 | −3.7364 | 0.24 | | |
| 13 | −1.9899 | 0.05 | 1.61340 | 44.27 |
| 14 | 11.2136 | 0.00 | 1.56002 | 37.65 |
| 15 | 11.2136 | 0.20 | 1.78470 | 26.29 |
| 16 | −2.0835 | 0.42 | | |
| 17(STOP) | ∞ | 0.19 | | |
| 18 | 1.1966 | 0.13 | 1.51823 | 58.90 |
| 19 | 1.8536 | 0.35 | | |
| 20 | 2.2069 | 0.07 | 1.48749 | 70.23 |
| 21 | 1.2994 | 0.23 | | |
| 22 | 2.4302 | 0.08 | 1.80518 | 25.42 |
| 23 | 1.1385 | 0.00 | 1.56002 | 37.65 |
| 24 | 1.1385 | 0.23 | 1.49700 | 81.54 |
| 25 | −4.4382 | 0.01 | | |

TABLE 3-continued

EXAMPLE 2·BASIC LENS DATA

| Si | Ri | Di | ndj | vdj |
|---|---|---|---|---|
| 26 | 4.9724 | 0.26 | 1.49700 | 81.54 |
| 27 | −1.0627 | 0.00 | 1.56002 | 37.65 |
| 28 | −1.0627 | 0.14 | 1.80518 | 25.42 |
| 29 | −3.9192 | 0.14 | | |
| 30 | 59.8513 | 0.16 | 1.80000 | 29.84 |
| 31 | −2.9973 | 1.21 | | |
| 32 | ∞ | 0.11 | 1.51633 | 64.14 |
| 33 | ∞ | 0.29 | | |

TABLE 4

EXAMPLE 2·OTHER DATA

| | |
|---|---|
| f | 1.00 |
| Bf | 1.57 |
| FNo. | 1.90 |
| 2ω[°] | 76.0 |

Example 3

FIG. 4 illustrates the arrangement of lens groups in a retrofocus-type wide angle lens in Example 3. The retrofocus-type wide angle lens in Example 3 is configured almost similar to the retrofocus-type wide angle lens in Example 1, which has been described already. However, Example 3 differs from Example 1 in that aperture stop St is arranged between positive meniscus lens L31 and negative meniscus lens L32 in 3a-th lens group G3*a*.

Table 5 shows basic lens data of the retrofocus-type wide angle lens in Example 3, and Table 6 shows other data of the retrofocus-type wide angle lens in Example 3. FIG. 8, Sections A through D are diagrams illustrating various aberrations of the retrofocus-type wide angle lens in Example 3.

TABLE 5

EXAMPLE 3·BASIC LENS DATA

| Si | Ri | Di | ndj | vdj |
|---|---|---|---|---|
| 1 | 3.7506 | 0.31 | 1.77250 | 49.60 |
| 2 | 10.2386 | 0.02 | | |
| 3 | 1.8527 | 0.07 | 1.61800 | 63.33 |
| 4 | 1.0431 | 0.54 | | |
| 5 | 6.0226 | 0.07 | 1.84661 | 23.78 |
| 6 | 1.0148 | 0.36 | | |
| 7 | 7.6122 | 0.12 | 1.48749 | 70.23 |
| 8 | 2.1337 | 0.67 | | |
| 9 | 7.9118 | 0.46 | 1.90366 | 31.32 |
| 10 | −0.9529 | 0.00 | 1.56002 | 37.65 |
| 11 | −0.9529 | 0.07 | 1.84661 | 23.78 |
| 12 | −4.0727 | 0.16 | | |
| 13 | −2.1202 | 0.05 | 1.62041 | 60.29 |
| 14 | 32.6064 | 0.00 | 1.56002 | 37.65 |
| 15 | 32.6064 | 0.17 | 1.84661 | 23.78 |
| 16 | −2.1682 | 0.43 | | |
| 17 | 1.2490 | 0.12 | 1.51823 | 58.90 |
| 18 | 1.8697 | 0.22 | | |
| 19(STOP) | ∞ | 0.27 | | |
| 20 | 2.4552 | 0.13 | 1.51742 | 52.43 |
| 21 | 1.4662 | 0.25 | | |
| 22 | 2.7258 | 0.08 | 1.80518 | 25.42 |
| 23 | 1.1670 | 0.00 | 1.56002 | 37.65 |
| 24 | 1.1670 | 0.22 | 1.49700 | 81.54 |
| 25 | −4.7751 | 0.01 | | |
| 26 | 8.5700 | 0.27 | 1.49700 | 81.54 |

TABLE 5-continued

EXAMPLE 3•BASIC LENS DATA

| Si | Ri | Di | ndj | vdj |
|---|---|---|---|---|
| 27 | −0.9612 | 0.00 | 1.56002 | 37.65 |
| 28 | −0.9612 | 0.07 | 1.84661 | 23.78 |
| 29 | −3.0297 | 0.31 | | |
| 30 | 9.0640 | 0.21 | 1.74950 | 35.28 |
| 31 | −2.4861 | 1.02 | | |
| 32 | ∞ | 0.11 | 1.51633 | 64.14 |
| 33 | ∞ | 0.48 | | |

TABLE 6

EXAMPLE 3•OTHER DATA

| | |
|---|---|
| f | 1.00 |
| Bf | 1.57 |
| FNo. | 1.90 |
| 2ω[°] | 75.6 |

Example 4

FIG. 5 illustrates the arrangement of lens groups in a retrofocus-type wide angle lens in Example 4. The retrofocus-type wide angle lens in Example 4 is configured almost similar to the retrofocus-type wide angle lens in Example 1, which has been described already. However, Example 4 differs from Example 1 in that second lens group G2 consists of a second-group first cemented lens of biconvex lens L21 and negative meniscus lens L22 with its convex surface facing the image side, biconvex lens L23, and a second-group second cemented lens of biconcave lens L24 and biconvex lens L25 in this order from the object side, and that aperture stop St is arranged between positive meniscus lens L31 and negative meniscus lens L32 in 3a-th lens group G3a.

Table 7 shows basic lens data of the retrofocus-type wide angle lens in Example 4, and Table 8 shows other data of the retrofocus-type wide angle lens in Example 4. FIG. 9, Sections A through D are diagrams illustrating various aberrations of the retrofocus-type wide angle lens in Example 4.

TABLE 7

EXAMPLE 4•BASIC LENS DATA

| Si | Ri | Di | ndj | vdj |
|---|---|---|---|---|
| 1 | 3.0436 | 0.39 | 1.77250 | 49.60 |
| 2 | 6.6882 | 0.01 | | |
| 3 | 1.5472 | 0.11 | 1.56883 | 56.36 |
| 4 | 0.9213 | 0.52 | | |
| 5 | 4.0130 | 0.07 | 1.84661 | 23.78 |
| 6 | 0.9680 | 0.34 | | |
| 7 | −9.2870 | 0.07 | 1.52249 | 59.84 |
| 8 | 2.0845 | 0.58 | | |
| 9 | 7.4780 | 0.50 | 1.83400 | 37.16 |
| 10 | −0.9126 | 0.00 | 1.56002 | 37.65 |
| 11 | −0.9126 | 0.05 | 1.78470 | 26.29 |
| 12 | −4.1731 | 0.18 | | |
| 13 | 12.0559 | 0.13 | 1.84661 | 23.78 |
| 14 | −7.0047 | 0.29 | | |
| 15 | −2.3010 | 0.05 | 1.81600 | 46.62 |
| 16 | 13.3550 | 0.00 | 1.56002 | 37.65 |
| 17 | 13.3550 | 0.20 | 1.84661 | 23.78 |
| 18 | −2.0863 | 0.01 | | |
| 19 | 1.1627 | 0.13 | 1.48749 | 70.23 |
| 20 | 1.6576 | 0.23 | | |

TABLE 7-continued

EXAMPLE 4•BASIC LENS DATA

| Si | Ri | Di | ndj | vdj |
|---|---|---|---|---|
| 21(STOP) | ∞ | 0.16 | | |
| 22 | 2.3427 | 0.07 | 1.56732 | 42.82 |
| 23 | 1.3539 | 0.34 | | |
| 24 | 3.6390 | 0.09 | 1.74000 | 28.30 |
| 25 | 1.1022 | 0.00 | 1.56002 | 37.65 |
| 26 | 1.1022 | 0.25 | 1.49700 | 81.54 |
| 27 | −4.3854 | 0.02 | | |
| 28 | 22.5077 | 0.26 | 1.49700 | 81.54 |
| 29 | −0.8813 | 0.00 | 1.56002 | 37.65 |
| 30 | −0.8813 | 0.07 | 1.78470 | 26.29 |
| 31 | −3.1054 | 0.21 | | |
| 32 | 4.2973 | 0.26 | 1.67790 | 55.34 |
| 33 | −2.2915 | 0.14 | | |
| 34 | ∞ | 0.11 | 1.51680 | 64.20 |
| 35 | ∞ | 1.33 | | |

TABLE 8

EXAMPLE 4•OTHER DATA

| | |
|---|---|
| f | 1.00 |
| Bf | 1.55 |
| FNo. | 1.90 |
| 2ω[°] | 76.0 |

Table 9 shows values of conditions defined by the aforementioned conditional expressions (1) through (4), specifically, parts of the expressions represented by characters for each of Examples 1 through 4. Table 9 shows values for d-line. As Table 9 shows, all of the retrofocus wide-angle lenses in Examples 1 through 4 satisfy all of conditional expressions (1) through (4). Further, all of the retrofocus wide-angle lenses in Examples 1 through 4 satisfy all of conditional expressions (1-1) through (4-1), which represent more desirable ranges than the ranges defined by conditional expressions (1) through (4).

TABLE 9

| EXPRESSION NUMBER | CONDITIONAL EXPRESSION | EXAMPLE 1 | EXAMPLE 2 | EXAMPLE 3 | EXAMPLE 4 |
|---|---|---|---|---|---|
| (1) | f/f1 | −0.978 | −0.998 | −1.018 | −1.060 |
| (2) | f/f3b | 0.450 | 0.438 | 0.460 | 0.479 |
| (3) | f/f2 | 0.474 | 0.461 | 0.462 | 0.538 |
| (4) | nd2p | 1.90366 | 1.90366 | 1.90366 | 1.83400 |

As the described numerical value data and aberration diagrams show, each of the examples can achieve high optical performance in which an F-number is about 1.9, which means a fast lens, and various aberrations are excellently corrected while a full angle of view is 75.4 through 76.0 degrees, which means a wide angle.

FIG. 1 illustrates an example in which optical member PP is arranged between the lens system and imaging surface Sim. However, various filters, such as a low-pass filter and a filter that cuts a specific wavelength range, may be arranged between lenses instead of being arranged between the lens system and imaging surface Sim. Alternatively, a coating having an action similar to the action of various filters may be applied to a lens surface of one of the lenses.

Figure 10:
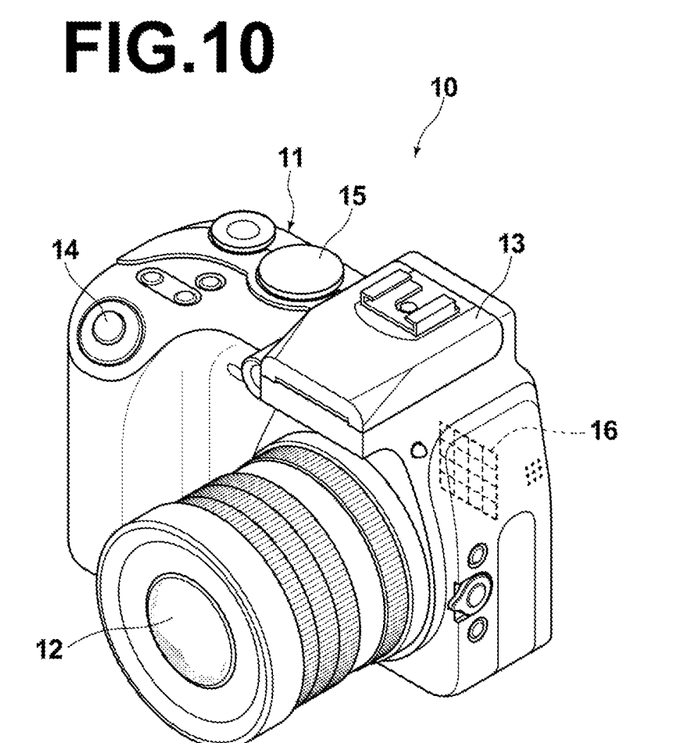
FIG. 10 is a schematic diagram illustrating the configuration of an imaging apparatus according to an embodiment of the present invention.

Next, an imaging apparatus according to an embodiment of the present invention will be described. FIG. 10 is a schematic diagram illustrating the configuration of a digital single-lens reflex camera on which a retrofocus-type wide angle lens according to an embodiment of the present invention has been mounted, as an example of an imaging apparatus according to an embodiment of the present invention. Here, the imaging apparatus is not limited to the digital single-lens reflex camera. The retrofocus-type wide angle lens according to an embodiment of the present invention may be mounted on a digital mirrorless single-lens camera or the like.

A camera 10, illustrated in FIG. 10, is a digital single-lens reflex camera. The camera 10 includes a camera body 11, a retrofocus-type wide angle lens 12 mounted on the front side of the camera body 11, a strobe light emission device 13 provide at the top of the camera body 11, a shutter button 14, and a mode dial 15. Further, the camera 10 includes an imaging device 16, such as a CCD and a CMOS, which converts an optical image formed by the retrofocus-type wide angle lens 12 into electrical signals in the camera body 11.

The retrofocus-type wide angle lenses in the examples of the present invention have the aforementioned advantageous points. Therefore, the camera 10 can obtain bright video images having excellent image qualities.

So far, the present invention has been described by using embodiments and examples. However, the present invention is not limited to the aforementioned embodiments and examples, and various modifications are possible. For example, the values of a curvature radius, a distance between surfaces, a refractive index, an Abbe number and the like of each lens element are not limited to the values in the aforementioned numerical value examples, but may be other values.

What is claimed is:

1. A retrofocus-type wide angle lens consisting of:
   a first lens group having negative refractive power as a whole;
   a second lens group having positive refractive power as a whole; and
   a third lens group having positive refractive power as a whole in this order from an object side,
   wherein the first lens group consists of a positive meniscus lens with its convex surface facing the object side and three negative meniscus lenses with their convex surfaces facing the object side in this order from the object side,
   wherein the second lens group includes at least two cemented lenses, and a lens closest to an image side in the second lens group is one of the at least two cemented lenses, and
   wherein the third lens group consists of a 3a-th lens group, which consists of a positive meniscus lens with its convex surface facing the object side and a negative meniscus lens with its convex surface facing the object side, and a 3b-th lens group, which includes at least two cemented lenses and has positive refractive power as a whole, in this order from the object side.

2. The retrofocus-type wide angle lens, as defined in claim 1, wherein a lens having positive refractive power is arranged closest to the image side in the 3b-th lens group.

3. The retrofocus-type wide angle lens, as defined in claim 1, wherein the 3b-th lens group includes a third-group first cemented lens having a cemented surface that is convex toward the object side and a third-group second cemented lens having a cemented surface that is convex toward the image side in this order from the object side.

4. The retrofocus-type wide angle lens, as defined in claim 1, wherein the second lens group includes a second-group first cemented lens having a cemented surface that is convex toward the image side and a second-group second cemented lens having a cemented surface that is convex toward the object side in this order from the object side.

5. The retrofocus-type wide angle lens, as defined in claim 1, wherein a stop is arranged closer to the object side than a surface closest to the image side in the 3a-th lens group.

6. The retrofocus-type wide angle lens, as defined in claim 1, wherein focusing is performed by moving the 3b-th lens group in the direction of an optical axis.

7. The retrofocus-type wide angle lens, as defined in claim 1, wherein the following conditional expression (1) is satisfied:

$$-1.4 < f/f1 < -0.6 \qquad (1),\text{ where}$$

f: a focal length of an entire system, and
f1: a focal length of the first lens group.

8. The retrofocus-type wide angle lens, as defined in claim 1, wherein the following conditional expression (2) is satisfied:

$$0.3 < f/f3b < 0.6 \qquad (2),\text{ where}$$

f: a focal length of an entire system, and
f3b: a focal length of the 3b-th lens group.

9. The retrofocus-type wide angle lens, as defined in claim 1, wherein the following conditional expression (3) is satisfied:

$$0.3 < f/f2 < 0.7 \qquad (3),\text{ where}$$

f: a focal length of an entire system, and
f1: a focal length of the second lens group.

10. The retrofocus-type wide angle lens, as defined in claim 1, wherein one of the at least two cemented lenses closest to the object side in the second lens group includes a lens having positive refractive power, and
   wherein refractive index nd2p for d-line of the lens having positive refractive power satisfies the following conditional expression (4):

$$1.80 < nd2p \qquad (4).$$

11. The retrofocus-type wide angle lens, as defined in claim 7, wherein the following conditional expression (1-1) is satisfied:

$$-1.2 < f/f1 < -0.8 \qquad (1\text{-}1),\text{ where}$$

f: a focal length of an entire system, and
f1: a focal length of the first lens group.

12. The retrofocus-type wide angle lens, as defined in claim 8, wherein the following conditional expression (2-1) is satisfied:

$$0.4 < f/gf3b < 0.5 \qquad (2\text{-}1),\text{ where}$$

f: a focal length of an entire system, and
f3b: a focal length of the 3b-th lens group.

13. The retrofocus-type wide angle lens, as defined in claim 9, wherein the following conditional expression (3-1) is satisfied:

$$0.4 < f/f2 < 0.6 \qquad (3\text{-}1),\text{ where}$$

f: a focal length of an entire system, and
f2: a focal length of the second lens group.

14. Rhe retrofocus-type wide angle lens, as defined in claim 10, wherein refractive index nd2p for d-line of the lens having positive refractive power in one of the at least two cemented lenses closest to the object side in the second lens group satisfies the following conditional expression (4-1):

$$1.84 < nd2p \qquad (4\text{-}1).$$

15. An imaging apparatus comprising:
the retrofocus-type wide angle lens, as defined in claim 1, mounted thereon.

\* \* \* \* \*